United States Patent [19]

Schirr et al.

[11] Patent Number: 6,066,412
[45] Date of Patent: *May 23, 2000

[54] DIRECTLY PRINTED GALVANIC CELL

[75] Inventors: Jürgen Schirr; Christoph Klaus, both of Ellwangen, Germany

[73] Assignee: Heitkamp & Thumann Metallverarbeitung GmbH & Co. KG, Marsberg, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/948,451

[22] Filed: Oct. 10, 1997

[30] Foreign Application Priority Data

Oct. 18, 1996 [DE] Germany ............................ 196 43 011

[51] Int. Cl.⁷ ............................ H01M 2/02; H01M 6/00
[52] U.S. Cl. ..................... 429/167; 429/168; 29/623.1; 29/623.4; 29/623.5
[58] Field of Search ..................................... 429/163, 167, 429/168, 176; 29/623.1–623.5

[56] References Cited

U.S. PATENT DOCUMENTS

| | | |
|---|---|---|
| 1,610,063 | 12/1926 | Lyndon . |
| 2,544,115 | 3/1951 | Wagner . |
| 4,436,777 | 3/1984 | Karpiloff . |
| 4,608,323 | 8/1986 | Zaborney ................................ 429/167 |
| 4,801,514 | 1/1989 | Will et al. . |
| 4,869,978 | 9/1989 | Kubo et al. . |
| 5,223,003 | 6/1993 | Tucholski et al. ..................... 29/623.4 |
| 5,665,443 | 9/1997 | Hata et al. ............................. 428/34.9 |

FOREIGN PATENT DOCUMENTS

| | | |
|---|---|---|
| 16 71 802 B2 | of 0000 | Germany . |
| 28 45 242 C2 | of 0000 | Germany . |
| Wo 94/19835 | of 0000 | WIPO . |

*Primary Examiner*—Maria Nuzzolillo
*Assistant Examiner*—Tracy Dove
*Attorney, Agent, or Firm*—Schnader Harrison Segal & Lewis LLP

[57] ABSTRACT

The invention relates to a galvanic cell comprising an outer metallic jar which on its outside has an insulating and a decorative layer, which has been applied directly onto the metallic jar by means of a printing and/or coating process.

6 Claims, No Drawings

DIRECTLY PRINTED GALVANIC CELL

BACKGROUND OF THE INVENTION

1. Field of the Invention

The invention relates to a galvanic cell comprising an outer metallic jar which on its outside has an insulating and decorative layer.

2. Description of the Related Arts

Galvanic cells which are mainly used in electrically operated appliances have an electrically insulated jacket and two contacts which, as a rule, are situated opposite one another. The electric circuit of the electrical appliance is closed via the contact areas. The insulation situated between the contact areas is intended to prevent inadvertent discharge of the cells. Thus, for example, many electrical appliances are fitted with a spiral spring as the electrical contact area, the jacket-type insulation protecting the two cell terminals against short-circuiting by inadvertent canting of said spiral spring. The insulating casing of the galvanic cells further protects the cells against environmental influences which lead to scratches, spots or traces of corrosion on the cell jar. The insulating casing of the galvanic cells is also provided with inscriptions and advertising material. On the one hand, this decor comprises information on the electrochemical system used, the cell size, the cell voltage, the manufacturer, the country of origin and the guarantee period, but it is also intended to provide, by the way it is designed, an appropriate advertising message.

German patents DE 1671802 and DE 2845242 disclose metallic casings for galvanic cells, which on their outside have a decorative layer. These metallic casings are primarily employed for galvanic cells of the Leclanché type, to prevent electrolyte from escaping after the cells have been completely discharged. In the case of galvanic cells of the Leclanché type it is possible, as complete discharge of the cells is approached, for holes to be formed in the zinc anode designed as the jar. To protect the cells of the above-mentioned type from leaking, they are provided, an insulating layer being interposed, with a metallic jacket which is provided with a decorative layer. The above-described jacketing technique is also employed in galvanic cells of the alkali-manganese type. To increase the capacity of the cells, the film labels or adhesive labels disclosed by the documents U.S. Pat. No. 4,869,978, PCT application WO 94/19835 and U.S. Pat. No. 4,801,514 have been used, for some time now, for the purpose of electrical insulation and as decor, since it is thus possible to reduce the thickness of the casing. Keeping the dimensions of the galvanic cell constant it is thereby possible to use a larger cell vessel and thus to introduce more active compound into the cells. The known methods for electrically insulating jacketing of galvanic cells constitute a significant cost factor, and the battery manufacturers are also interested in reducing the thickness of the insulating layer.

SUMMARY OF THE INVENTION

The object of the invention is to specify galvanic cells and methods for fabricating them, which dispense with the known expensive methods for jacketing of the galvanic cells.

The object is achieved, according to the invention, by a galvanic cell comprising an outer metallic jar, where the insulating and decorative layer has been applied directly onto the metallic jar by means of a printing and/or coating process.

DETAILED DESCRIPTION

The galvanic cells are advantageously fabricated by the insulating and decorative layer being applied prior to the metallic jar being shaped. In a further development of the invention the galvanic cells are fabricated by at least the insulating layer being applied onto the prefabricated metallic jar. A further refinement of the Invention consists in the insulating and decorative layer being applied onto the metallic jar of the completed galvanic cell, i.e. onto galvanic cells which have been filled with active materials and sealed. In the process, the galvanic cells are fabricated by way of the insulating layer being applied by electrophoretic coating, spray coating, powder coating, knife application methods or dipping processes and the decorative layer being applied by printing processes such as distortion printing (i.e. printing which takes into account later deformation of the article during processing), flatbed screen printing, rotary screen printing, offset printing or pad printing. Preference is given to the use of UV-curable coatings. The use of such coatings enables high fabrication cycle rates and reduces the risk of damage to the cells, since no heat treatment of the cells is required for efficient curing of the coating layer. The novel galvanic cells and the methods for fabricating them have the following advantages:

1. A continuous production which can be carried out at high speed
2. Savings in material costs by eliminating the plastic film label
3. Simplification of the fabrication steps by virtue of reduced fabrication depth, since prefabrication of the printed film tape, cutting and application steps and transport and storage are omitted
4. Achieving a higher cell capacity, since the coating of the jar is thinner than a film label and as a result a larger cell jar with a greater available volume can be utilized for electrochemically active material
5. High flexibility in choosing the cell design The invention is illustrated by means of the following examples:

EXAMPLE 1

Completed cells were provided, in a flatbed screen printing single step, with the insulating and decorative layer by direct printing of the rotating metallic jar. Printing was carried out with a conventional printing ink, set to a very high viscosity and based on polyacrylates or polyurethanes. Drying was effected by a stream of warm air at about 60° C. A layer thickness of the dry printing ink of from 10 to 20 $\mu$m afforded adequate insulation resistance.

EXAMPLE 2

To base-coat completed cells, they were spraycoated with epoxy resin, polyurethane resin or a polyacrylate as the insulating layer. The precoated cell jars were then provided with the decorative layer by means of flatbed printing in accordance with Example 1. The printing ink used was a UV-curable coating which cures within seconds. The coating attains an insulation resistance which is comparable to that of adhesive labels.

EXAMPLE 3

Prior to completion of the cells, the metallic jars were provided, in accordance with Example 2, with a base coat serving as the insulating layer. The decorative layer was applied onto these precoated cells by rotary offset printing, using conventional printing inks. A layer thickness of about 20 μm afforded an insulation resistance which met practical requirements.

EXAMPLE 4

A cell jar is spray-coated with a resilient, abrasion-resistant base coat. This is followed by baking at 180° C. The jars obtained are used for cell fabrication in the same way as uncoated jar bulk material. The coating involving baking and the resilience of the coating layer prevent the coating from spalling off in the bead zone at the bead. Subsequent application of the decor by offset printing is carried out using a UV-curable coating system (layer thickness typically from 1 to 5 pm). This can be concluded by the application of a clear-varnish topcoat (layer thickness typically from 10 to 30 μm). The use of a UV coating has the advantage that curing does not require the cell to be subjected to thermal stress.

EXAMPLE 5

A UV-curable base coat (e.g. 20 μm) is applied onto the finished cell by roller printing. This is followed by application of the decorative layer (usually 2–10 μm) by offset printing, up to seven colors being customary and possible within one operation. A topcoat layer, in the form of a likewise UV-curable system, is applied at the end for the purpose of additional mechanical protection and to increase the gloss.

EXAMPLE 6

A 2-component coating system is applied by spray coating onto the finished cell. Subsequent formation of the decor is effected by offset printing with a UV-curable coating. Additional roller coating is carried out with a UV-curable clear coating, said clear coating containing UV-absorbing or fluorescing components. An advantage of this is that a cell thus printed can be recognized and sorted by scanner systems.

What is claimed is:

1. A galvanic cell comprising an outer metallic jar having a directly applied UV-curable insulative coating and a printed UV-curable decorative layer which has been applied directly onto the insulative coating, whereby an electrically insulated jacket is excluded.

2. A method for fabricating a galvanic cell comprising an outer metallic jar having an outer surface with an insulative coating and a printed decorative layer applied directly onto the outer surface of the metallic jar, whereby an electrically insulated jacket is excluded, comprising the steps of (a) directly applying the insulative coating onto a prefabricated metallic jar, (b) printing the decorative layer directly on the insulative coating, and (c) completing the fabrication of the galvanic cell.

3. The method of claim 2, wherein steps (a) and (b) of the method are completed prior to completing the fabrication of the galvanic cell, step (c).

4. The method of claim 2, wherein step (a) includes applying the insulative coating by electrophoretic coating, spray coating, powder coating, knife application methods, or dipping processes, and step (b) includes applying the decorative layer by distortion printing, flatbed screen printing, rotary screen printing, offset printing, or pad printing.

5. The method of claim 2, wherein the insulative coating and the decorative layer are UV curable.

6. The method of claim 5, wherein the method further comprises the step of curing the insulative coating and decorative layer by UV radiation.

* * * * *